(12) United States Patent
Shaffer et al.

(10) Patent No.: US 8,874,159 B2
(45) Date of Patent: Oct. 28, 2014

(54) METHOD AND SYSTEM FOR HANDLING DYNAMIC INCIDENTS

(75) Inventors: Shmuel Shaffer, Palo Alto, CA (US); Kittur V. Nagesh, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1737 days.

(21) Appl. No.: 11/746,960

(22) Filed: May 10, 2007

(65) Prior Publication Data

US 2008/0280637 A1 Nov. 13, 2008

(51) Int. Cl.
| | | |
|---|---|---|
| H04M 3/42 | (2006.01) |
| H04B 7/00 | (2006.01) |
| G08B 21/00 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| G06Q 10/00 | (2012.01) |
| G06F 15/16 | (2006.01) |
| G06F 3/16 | (2006.01) |
| G06F 15/177 | (2006.01) |
| G06F 3/00 | (2006.01) |
| G06F 9/44 | (2006.01) |
| G06F 9/46 | (2006.01) |
| G06F 13/00 | (2006.01) |
| G06F 17/00 | (2006.01) |
| H04L 29/06 | (2006.01) |
| G06F 12/14 | (2006.01) |
| G06F 12/16 | (2006.01) |
| G08B 23/00 | (2006.01) |
| H04W 4/10 | (2009.01) |
| H04W 76/00 | (2009.01) |
| H04L 12/24 | (2006.01) |
| H04L 29/14 | (2006.01) |

(52) U.S. Cl.
CPC ....... *H04W 4/10* (2013.01); *H04Q 2213/13098* (2013.01); *H04Q 2213/1337* (2013.01); *H04W 76/005* (2013.01); *H04L 41/0893* (2013.01); *H04Q 2213/13103* (2013.01); *H04Q 2213/13288* (2013.01); *H04L 69/40* (2013.01); *H04L 41/069* (2013.01); *H04Q 2213/13389* (2013.01); *H04Q 2213/13109* (2013.01)
USPC ........ 455/519; 455/414.1; 455/518; 455/520; 340/540; 370/252; 370/328; 705/1.1; 705/2; 709/204; 715/736; 719/328; 726/1; 726/23

(58) Field of Classification Search
CPC ....... H04W 4/10; H04W 76/005; H04W 4/02; H04W 4/08; H04W 4/22; H04W 76/007; H04W 84/08; H04W 84/18
USPC ............ 455/11.1, 414.1, 450, 515, 517, 518, 455/519, 520, 552, 556, 557, 575, 457, 509, 455/5, 57; 340/8.1, 540, 534; 370/70, 312, 370/340, 342, 345, 390, 484, 230, 254, 370/328; 379/158, 188; 706/47, 48; 726/11, 726/23, 25
See application file for complete search history.

(56) References Cited

U.S. PATENT DOCUMENTS

| 4,359,603 A | 11/1982 | Heaton | 370/267 |
| 4,730,306 A | 3/1988 | Uchida | 370/263 |

(Continued)

FOREIGN PATENT DOCUMENTS

| WO | WO 01/91485 | 11/2001 | ....... H04Q 7/22 |
| WO | WO 02/074051 | 9/2002 | |

OTHER PUBLICATIONS

Rivero-Angeles, Mario et al., *Random-Access Control Mechanism Using Adaptive Traffic Load in ALOHA and CSMA Strategies for EDGE*, May 2005, IEEE Transactions on Vehicular Technology, Vo. 54, No. 3, 2 (1161) May 2005.

(Continued)

Primary Examiner — Yuwen Pan
Assistant Examiner — Paul P Tran
(74) Attorney, Agent, or Firm — Baker Botts L.L.P.

(57) ABSTRACT

A method for handling dynamic incidents includes initiating a first policy in response to a first incident. The first policy comprises a plurality of actions to be performed in response to the first incident. The method also includes creating at least one virtual talk group comprising a plurality of endpoints of different communication networks communicating using a respective communication protocol. The method further includes monitoring a plurality of events via a plurality of sources. At least one source comprises an endpoint from the plurality of endpoints of the virtual talk group. The method additionally includes detecting a deviation event and storing information indicative of the deviation event.

19 Claims, 3 Drawing Sheets

(56) References Cited

U.S. PATENT DOCUMENTS

| | | | |
|---|---|---|---|
| 5,048,082 A | 9/1991 | Krafft et al. | 379/406.07 |
| 5,099,510 A | 3/1992 | Blinken et al. | 379/202.01 |
| 5,117,501 A * | 5/1992 | Childress et al. | 455/11.1 |
| 5,436,896 A | 7/1995 | Anderson et al. | 370/260 |
| 5,539,741 A | 7/1996 | Barraclough et al. | 370/267 |
| 5,625,407 A | 4/1997 | Biggs et al. | 348/14.11 |
| 6,011,851 A | 1/2000 | O'Connor et al. | 381/17 |
| 6,094,578 A | 7/2000 | Purcell et al. | 455/426 |
| 6,178,237 B1 | 1/2001 | Horn | 379/202.01 |
| 6,185,205 B1 | 2/2001 | Sharrit et al. | 370/389 |
| 6,233,315 B1 | 5/2001 | Reformato et al. | 379/88.01 |
| 6,327,567 B1 | 12/2001 | Willehadson et al. | 704/270 |
| 6,366,782 B1 * | 4/2002 | Fumarolo et al. | 455/457 |
| 6,374,100 B1 | 4/2002 | Smith et al. | 455/419 |
| 6,400,816 B1 | 6/2002 | Hjalmtysson et al. | 379/201.03 |
| 6,404,873 B1 | 6/2002 | Beyda et al. | 379/202.01 |
| 6,408,327 B1 | 6/2002 | McClennon et al. | 709/204 |
| 6,418,214 B1 | 7/2002 | Smythe et al. | 379/202.01 |
| 6,453,022 B1 | 9/2002 | Weinman, Jr. | 379/88.13 |
| 6,501,739 B1 | 12/2002 | Cohen | 370/260 |
| 6,608,820 B1 | 8/2003 | Bradshaw, Jr. | 370/260 |
| 6,792,092 B1 | 9/2004 | Michalewicz | 379/202 |
| 6,850,496 B1 | 2/2005 | Knappe et al. | 370/260 |
| 6,873,854 B2 | 3/2005 | Crockett et al. | 455/518 |
| 6,882,856 B1 | 4/2005 | Alterman et al. | 455/519 |
| 6,885,874 B2 | 4/2005 | Grube et al. | 455/520 |
| 6,912,389 B2 | 6/2005 | Bright et al. | 455/433 |
| 6,982,961 B2 | 1/2006 | Refai et al. | 370/265 |
| 6,987,480 B1 | 1/2006 | Kotick et al. | 342/41 |
| 6,987,841 B1 | 1/2006 | Byers et al. | 379/88.17 |
| 6,993,120 B2 | 1/2006 | Brown et al. | 379/88.13 |
| 6,996,406 B2 | 2/2006 | Lection et al. | 455/457 |
| 6,999,782 B2 | 2/2006 | Shaughnessy et al. | 455/518 |
| 6,999,783 B2 | 2/2006 | Toyryla et al. | 455/519 |
| 7,003,286 B2 | 2/2006 | Brown et al. | 455/416 |
| 7,006,607 B2 | 2/2006 | Garcia | 379/88.18 |
| 7,010,106 B2 | 3/2006 | Gritzer et al. | 379/202.01 |
| 7,010,109 B2 | 3/2006 | Gritzer et al. | 379/202.01 |
| 7,010,275 B2 | 3/2006 | Davies | 455/90.2 |
| 7,013,279 B1 | 3/2006 | Nelson | 704/270 |
| 7,031,700 B1 | 4/2006 | Weaver et al. | 455/420 |
| 7,035,385 B2 | 4/2006 | Levine et al. | 379/88.23 |
| 7,058,168 B1 | 6/2006 | Knappe et al. | 379/204.01 |
| 7,079,857 B2 | 7/2006 | Maggenti et al. | 455/518 |
| 7,162,199 B1 * | 1/2007 | Glickstein et al. | 455/3.02 |
| 2001/0028321 A1 | 10/2001 | Krasner | 342/357.1 |
| 2002/0013813 A1 | 1/2002 | Matsuoka | 709/204 |
| 2002/0138406 A1 * | 9/2002 | Elgabry | 705/38 |
| 2002/0152305 A1 | 10/2002 | Jackson et al. | 709/224 |
| 2002/0178364 A1 | 11/2002 | Weiss | 713/182 |
| 2003/0050821 A1 * | 3/2003 | Brandt et al. | 705/9 |
| 2003/0100326 A1 | 5/2003 | Grube et al. | 455/515 |
| 2003/0200357 A1 * | 10/2003 | Yanosy | 709/328 |
| 2004/0054428 A1 | 3/2004 | Sheha et al. | 700/56 |
| 2004/0070515 A1 * | 4/2004 | Burkley et al. | 340/825.49 |
| 2004/0139320 A1 | 7/2004 | Shinohara | 713/168 |
| 2004/0185863 A1 | 9/2004 | Ogami | 455/452.1 |
| 2004/0192353 A1 | 9/2004 | Mason et al. | 455/457 |
| 2004/0249949 A1 | 12/2004 | Gourraud et al. | 709/227 |
| 2005/0135348 A1 | 6/2005 | Staack | 370/353 |
| 2005/0174991 A1 | 8/2005 | Keagy | 370/352 |
| 2005/0232207 A1 | 10/2005 | Antoniadis et al. | 370/338 |
| 2005/0265256 A1 * | 12/2005 | Delaney | 370/254 |
| 2006/0114847 A1 | 6/2006 | Dssouli et al. | 370/261 |
| 2006/0118636 A1 | 6/2006 | Miles et al. | 235/472 |
| 2006/0165060 A1 | 7/2006 | Dua | 370/352 |
| 2006/0211404 A1 * | 9/2006 | Cromp et al. | 455/405 |
| 2006/0235739 A1 * | 10/2006 | Levis et al. | 705/9 |
| 2007/0030144 A1 | 2/2007 | Titus et al. | 340/534 |
| 2007/0060144 A1 | 3/2007 | Mills et al. | 455/445 |
| 2007/0115848 A1 | 5/2007 | Chean et al. | 370/252 |
| 2008/0037461 A1 * | 2/2008 | Biltz et al. | 370/328 |
| 2008/0167049 A1 | 7/2008 | Karr et al. | 455/456 |
| 2008/0198422 A1 * | 8/2008 | Casey et al. | 358/425 |
| 2008/0244741 A1 * | 10/2008 | Gustafson et al. | 726/23 |

OTHER PUBLICATIONS

NetworkFirst Interoperability Solved, Data Sheet, M/A-COM, Inc., ECR-7018A, http://www.networkfirst.com/resources/pdf/NetworkFirstRevised5_03.pdf, 6 pages, May 2003.

Network Solution:, Information Sheet, NetworkFirst, M/A-COM, Inc., http://www.networkfirst.com/features/solution, 2 pages, 2003.

ACU-1000™ Interoperability NOW™, Information Sheet, Raytheon JPS Communications, http://www.jps.com/downloads/PDFS/acuupgrade.pdf, 4 pages, Mar. 2004.

Interoperability Gateway, OpenSky, NetworkFirst, P25$^{IP}$, Data Sheet, M/A-COM, Inc. ECR-7054, http://www.opensky.com/network/7054.pdf, 2 pages, May 2003.

C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages, Oct. 2003.

V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages, Oct. 2004.

Cisco IP Interoperability and Collaboration System, Q&A, Copyright © Cisco Systems, Inc. www.cisco.com, 4 pages, Oct. 2005.

Cisco IPICS, Solution Overview, Copyright © Cisco Systems, Inc., www.cisco.com/go/ipics, 6 pages, Oct. 2005.

MRT Urgent Communications: Service, Safety, Security, M/A-Com Emphasizes Power of IP in Seven Announcements at APCO, Aug. 18, 2002, 6 pages. http://mrtmag.com/products/new/radio_macom_emphasizes_power, Aug. 18, 2002.

Jim McKay, *Government Technology*, "Intact Amid Chaos", Mar. 2005, 2 pages, Mar. 2005.

Ian Hoffman, *Oakland Tribune*, "Oakland's New Radios Pass Test, City, Regional Agencies Get Green Light to Buy Public-Safety Equipment," 2007, 2 pages (reprinted by Tyco Electronics and available at http://www.macom-wireless.com/news/oaklands%20new%20radios.asp), Mar. 11, 2005.

MRT Urgent Communications: Service, Safety, Security, "5 for '05 Technologies," Dec. 1, 2004, 9 pages. http://mrtmag.com/mag/radio_technologies, Dec. 1, 2004.

MRT Urgent Communications: Service, Safety, Security, John Facella, "ROIP Success Is in the Details," Dec. 1, 2004, 3 pages. http://mrtmag.com/mag/radio_roip_success_details/, Dec. 1, 2004.

Ann Imse, *Rocky Mountain News*, "Radio Breakthrough for Cops, Firefighters," Dec. 10, 2004, 2 pgs., Dec. 10, 2004.

*First Responder Communications*, A Supplement to MRT and Fire Chief, "IP Opens Eyes," Aug. 2004, 5 pages.

*MRT, Mobile Radio Technology*, "IP Evangelist," Apr. 2004, 4 pages, www.iwce-mrt.com.

Ron Bender, et al., *MRT; Mobile Radio Technology* "Multiple Choices for Critical Communications," Oct. 2001, 4 pages, www.mrtmag.com.

Jay Herther, et al., *MRT; Mobile Radio Technology*, "Voice-over-Interintranet Protocol for Critical Communications," Aug. 2001, 4 pages, www.mrtmag.com.

*What's New in Radio Communications*, Aug./Sep. 2001, vol. 14 No. 1, Inside: Marine Radio, 2 pages, www.westwick-farrow.com.au Aug.-Sep. 2001.

NetworkFirst Interoperability Solved, Data Sheet, M/A-COM, Inc., ECR-7018A, http://www.networkfirst.com/resources/pdf/NetworkFirstRevised5_03.pdf, 6 pages.

Network Solution:, Information Sheet, NetworkFirst, M/A-COM, Inc., http://www.networkfirst.com/features/solution, 2 pages.

It's Our Network That Makes the Difference, Information Sheet, OpenSky Network, M/A-COM, Inc., http://www.opensky.com/network/index.asp, 2 pages.

Network Management, Information Sheet, OpenSky Network, M/A-COM, Inc., http://www.opensky.com/network/netmgmtsys.asp, 2 pages.

ACU-1000™ Interoperability NOW™, Information Sheet, Raytheon JPS Communications, http://www.jps.com/downloads/PDFS/acuupgrade.pdf, 4 pages.

(56) References Cited

OTHER PUBLICATIONS

Interoperability Gateway, OpenSky, NetworkFirst, P25$^{IP}$, Data Sheet, M/A-COM, Inc. ECR-7054, http://www.opensky.com/network/7054.pdf, 2 pages.
C3 Maestro$^{IP}$ Dispatch Console, OpenSky, NetworkFirst, P25$^{IP}$, Data Sheet, M/A-COM, Inc. ECR-7160A, http://www.opensky.com/network/7160.pdf, 2 pages.
V$^{IP}$ Dispatch Console, OpenSky, NetworkFirst, P25$^{IP}$, Data Sheet, M/A-COM, Inc. ECR-7241B, http://www.opensky.com/network/7241B.pdf, 2 pages.
J. Polk, et al., Dynamic Host Configuration Protocol Option for Coordinate-based Location Configuration Information, Network Working Group, Internet RFC 3825, Category: Standards Track, The Internet Society, 15 pages, Jul. 2004.
OnStar Technology, Information Sheet, OnStar Corp., http://www.onstar.com/us_english/jsp/explore/onstar_basics/technology.jsp, 3 pages, 2005
Cisco IP Interoperability and Collaboration System, Q&A, Copyright © Cisco Systems, Inc. www.cisco.com, 4 pages.
Cisco IPICS, Solution Overview, Copyright © Cisco Systems, Inc., www.cisco.com/go/ipics, 6 pages.
Matthews, et al., *A New Interoperability Paradigm A Concept Proposal*, Mar. 2006, *Worcester Polytechnic Institute, WPI Bioengineering Institute* (Mar. 2006), 15 pages.
Shaffer, et al., U.S. Appl. No. 11/149,041, filed Jun. 8, 2005, *Method and System for Communicating Using Position Information*.
Shaffer, et al., U.S. Appl. No. 11/201,832, filed Aug. 10, 2005, *Method and System for Automatic Configuration of Virtual Talk Groups Based on Location of Media Source*.
Shaffer, et al., U.S. Appl. No. 11/202,400, filed Aug. 10, 2005, *Method and System for Communicating Media Based on Location of Media Source*.
Shaffer, et al., U.S. Appl. No. 11/202,403, filed Aug. 10, 2005, *Method and System for Providing Interoperable Communications with Location Information*.
Shaffer, et al., U.S. Appl. No. 11/214,582, filed Aug. 29, 2005, *Method and System for Conveying Source Location Information*.
Shaffer, et al., U.S. Appl. No. 11/364,146, filed Feb. 27, 2006, *Method and System for Providing Interoperable Communication with Congestion Management*.
Shaffer, et al., U.S. Appl. No. 11/365,113, filed Feb. 28, 2006, *Method and System for Providing Interoperable Communication with Dynamic Event Area Allocation*.
Shaffer, et al., U.S. Appl. No. 11/399,031, filed Apr. 5, 2006, *Method and System for Managing Virtual Talk Groups*.
Shaffer, et al., U.S. Appl. No. 11/382,496, filed May 10, 2006, *Providing Multiple Virtual Talk Group Communication Sessions*.
Kalley, et al., U.S. Appl. No. 11/383,998, filed May 18, 2006, *Providing Virtual Talk Group Communication Sessions in Accordance with Endpoint Resources*.
Shaffer, et al., U.S. Appl. No. 11/421,994, filed Jun. 2, 2006, *Method and System for Joining a Virtual Talk Group*.
Shaffer, et al., U.S. Appl. No. 11/421,999, filed Jun. 2, 2006, *Method and System for Managing a Plurality of Virtual Talk Groups*.
Shaffer, et al., U.S. Appl. No. 11/746,960, filed Dec. 28, 2006, *Method and System for Providing Congestion Management within a Virtual Talk Group*.
Shaffer, et al., U.S. Appl. No. 11/550,234, filed Oct. 17, 2006, *Method and System for Providing an Indication of a Communication*.
PCT Notification of Transmittal of the International Search Report and the Written Opinion of the International Searching Authority, or the Declaration, mailed Feb. 27, 2007, corresponding to PCT/US06/30447 filed Aug. 3, 2006 (20 pages).
PCT Notification of Transmittal of the International Search Report and the Written Opinion of the International Searching Authority, or the Declaration, mailed Apr. 9, 2007, corresponding to PCT/US06/30294 filed Aug. 2, 2006 (20 pages).
PCT International Search Report and Written Opinion (ISA/US) for PCT/US06/19227; 7 pages, Sep. 4, 2007.

\* cited by examiner

METHOD AND SYSTEM FOR HANDLING DYNAMIC INCIDENTS

TECHNICAL FIELD OF THE INVENTION

This invention relates in general to communication systems and, more particularly, to a method and system for handling dynamic incidents.

BACKGROUND OF THE INVENTION

Many public and private groups, such as security and safety personnel (e.g., police, firefighters and ambulance drivers) rely on standard operating procedures (SOPs) to conduct their daily operations as well as to manage emergencies. These SOPs are well defined and well understood action steps for how agencies or groups of people from different communication networks are brought together. However, many incidents unfold in a dynamic manner and require deviations from the regular SOPs. For example, a Mayor's office may have to be alerted during the course of managing a hazardous material cleanup operation, or a hazmat specialist may have to be dynamically brought in to provide her knowledge and expertise.

The SOPs may involve facilitating communication between various communication networks of differing technologies and types (e.g., land mobile radios communicating through push-to-talk technologies). However, communications among different endpoints of different networks such as endpoints of different police, fire or other security networks may be difficult. Collaboration between the different agencies and networks tends to be ad hoc and inefficient. When achieved, it often involves laborious manual intervention. Organizations working towards interoperability solutions include Raytheon JPS Communications, IP Blue, Twisted Pair, M/A-COM and Cisco Systems.

SUMMARY OF THE INVENTION

The present invention provides methods and systems for handling dynamic incidents that substantially eliminate or reduce at least some of the disadvantages and problems associated with previous methods and systems.

In accordance with a particular embodiment, a method for handling dynamic incidents includes initiating a first policy in response to a first incident. The first policy comprises a plurality of actions to be performed in response to the first incident. The method also includes creating at least one virtual talk group comprising a plurality of endpoints of different communication networks communicating using a respective communication protocol. The method further includes monitoring a plurality of events via a plurality of sources. At least one source comprises an endpoint from the plurality of endpoints of the virtual talk group. The method additionally includes detecting a deviation event and storing information indicative of the deviation event.

In some embodiments the deviation event may comprise an unexpected event. In certain embodiments the deviation event is similar to a previously detected event. The previously detected event may have occurred during a second incident.

In particular embodiments the method may further include modifying the first policy based on the deviation event. In some embodiments the method may also include creating a second policy based on the first policy and the deviation event. In certain embodiments the method may additionally include, upon detecting the deviation event, generating a suggestion comprising at least one modification to the first policy.

In accordance with another embodiment, a system for handling dynamic incidents includes a processor operable to initiate a first policy in response to a first incident. The first policy comprises a plurality of actions to be performed in response to the first incident. The processor is also operable to create at least one virtual talk group comprising a plurality of endpoints of different communication networks communicating using a respective communication protocol. The system additionally includes an interface coupled to the processor. The interface is operable to monitor a plurality of events via a plurality of sources. At least one source comprises an endpoint from the plurality of endpoints of the virtual talk group. The interface is also operable to detect a deviation event. Furthermore, the processor is also operable to store information indicative of the deviation event.

Technical advantages of particular embodiments include methods and systems for handling dynamic incidents. Accordingly, an interoperability system may be able to adjust the actions of a policy or log the actions performed by a user in case an incident does not unfold exactly as the events of a standard operating procedure predicted it would unfold. Another technical advantage of particular embodiments is to allow deviations from a policy to be monitored and logged. Accordingly, the deviations may later be analyzed to determine if the policy needs to be updated or revised. The log of the deviations may also be stored in a database that may be used in creating or revising policies for different incidents.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
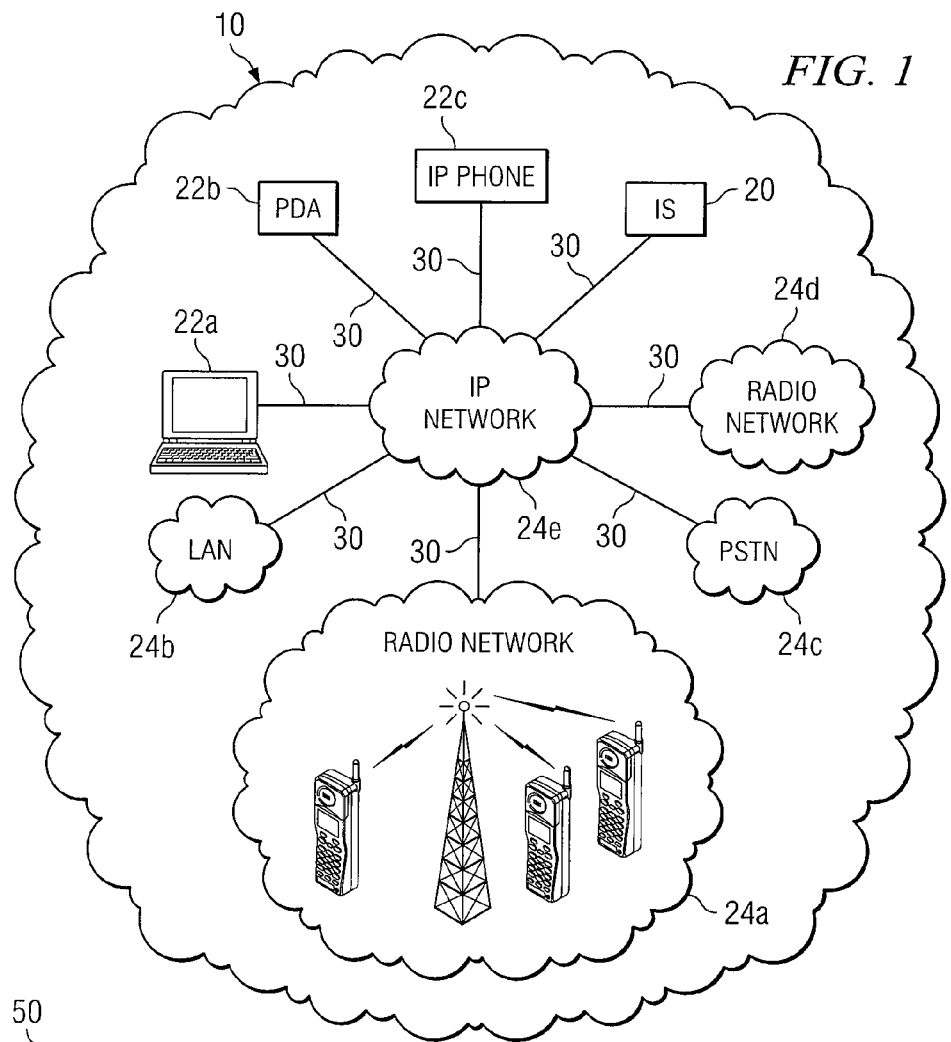
FIG. 1 illustrates a communication system with various communication networks and an interoperability system, in accordance with particular embodiments.

FIG. 1 illustrates a communication system 10, in accordance with particular embodiments. Communication system 10 includes communication networks 24a-24e, interoperability system (IS) 20 and endpoints 22a-22c. IS 20 is able to facilitate interoperable communication sessions between and among various communication devices, such as endpoints of communication networks 24 and endpoints 22. IS 20 uses a systems approach to offer a framework based on IP protocols and services to immediately achieve secure voice, video and other data interoperability among communication endpoints and networks utilizing different technologies.

Various institutions, companies, organizations and/or collaborations may have certain procedures that they follow in the event of an incident or situation. These procedures may often be referred to as standard operating procedures (SOPs). For example, in the event of a fire, a dispatcher may first call the fire department to send a fire truck to the scene and then, if there are people present, the dispatcher may then call for an ambulance to also be sent to the scene. In addition, any additional emergency response endpoints in the vicinity of the fire may be alerted of the fire and told its location (e.g., IS 20 may identify nearby endpoints and provide their contact information to a dispatcher). While the actions of SOPs may be followed under normal circumstances, it is quite possible that certain events may occur during the life of the incident that may require a deviation from the standard actions of the SOP. Accordingly, interoperability system 20 (IS 20) may allow the SOPs stored therein to be adapted to the deviations that may arise during a particular incident. In doing so IS 20 may log the various events and/or actions that occur, including any deviations from the SOP. The log may form the basis of a database which may then be used to suggest actions to take should a similar deviation arise during a different incident. For example, if someone was injured at the scene of the fire IS 20 may suggest that the dispatcher call the ambulance first rather than the fire truck. IS 20 may further be able to apply deviations from one SOP to another. For example, IS 20 may be able to apply the above deviation in which the ambulance was called first to a bank robbery in which someone was injured. More specifically, if the SOP for a bank robbery involves calling the police first and then an ambulance, if IS 20 knows someone is injured at the scene of the robbery it may suggest that an ambulance be called first and then the police based on the ambulance being called first for an injury at a fire. The database may also be used by officers/officials of an organization to evaluate their SOPs, revise SOPs that have problems or need updating, or create new SOPs.

In the illustrated embodiment, communication networks 24a and 24d comprise radio networks (RNs), communication network 24b comprises a local area network (LAN), communication network 24c comprises a public switched telephone network (PSTN) and communication network 24e comprises an IP network. It should be understood, however, that communication system 10 may comprise any number of IP or non-IP communication networks of any wireless or wireline form capable of communicating audio and/or video telecommunication signals, data, and/or messages, including signals, data or messages. Communication networks 24a-24e may include any number and combination of segments, nodes and endpoints to enable communication among network devices and components. Communication networks 24a-24e may be distributed locally or across multiple cities and geographic regions. Nodes may include any combination of network components, gatekeepers, call managers, conference bridges, routers, hubs, switches, gateways, base stations, endpoints or other hardware, software or embedded logic implementing any number of communication protocols that allow for the exchange of data in communication system 10. Segments 30, which may comprise any suitable wireless or wireline communication links, including one or more communication networks (e.g., WANs) as appropriate, couple various networks with each other and with endpoints 22 and IS 20. In particular embodiments, segments 30 may include gateways for facilitating communication between various networks, such as a land mobile radio (LMR) gateway between radio network 24a and IP network 24e.

In some cases, IS 20 may facilitate, either directly (e.g., rebroadcasting communications between endpoints) or indirectly (e.g., configuring external equipment), communication between users of endpoints of one of communication networks 24a-24e with endpoints of another of communication networks 24a-24e. A radio network, such as radio network 24a or 24d, may support communication among portable mobile station endpoints, such as land mobile radios (LMRs), using any suitable communication methods or features, such as cellular and push-to-talk (PTT). Communication networks 24a-24e may comprise networks of particular groups or agencies (e.g., a municipality's police department network), whether operational with respect to a particular area or otherwise.

IS 20 enables, facilitates and/or provides for interoperable communication among communication endpoints and devices, such as LMRs, cellular phones, IP phones, PCs, PDAs, PSTN phones, video monitors, cameras and sensors of one or more communication networks (e.g., communication networks 24a-24e) using Internet Protocol. Such endpoints may comprise IP or non-IP-enabled endpoints. In particular embodiments, IS 20 may control gateways (for example, of segments 30) in order to map radio frequencies of particular mobile radio endpoints to IP addresses for communication to other types of radio endpoints or IP devices. For example, a particular gateway may be able to receive communications from various types of endpoints (e.g., on various types of communication networks) and may convert such communications for transmission to other types of endpoints. IS 20's control of the gateway may control the various endpoints and/or networks that receive particular communications, depending on system functionality and configuration. As indicated, such control may include the mapping of communications and endpoints to IP addresses for interoperable communication. In some embodiments, IS 20 may host audio conferences that bridge communications received from different types of endpoints. As indicated above, communication system 10 (including IS 20) may include any suitable number or type of gateways (e.g., LMR and PSTN gateways), servers (e.g., multipoint conference servers), switches, routers, firewalls, access points, processors, memory or other hardware, software or encoded logic to provide any of the functionality described herein. IS 20 is coupled to communication networks 24a-24d and endpoints 22 through IP network 24e, which may comprise any suitable IP network.

IS 20 may use IP to enable communication among endpoints of various networks. The manner in which IS 20 facilitates communications among endpoints may vary according to location and system or operational needs. For example, IS 20 may communicate with endpoints using multicast IP addresses assigned to an endpoint of a communication network, a group of endpoints of a communication network or one or more endpoints of multiple communication networks or alternatively using a peer to peer dialed connection or a nailed dialed connection. A group of endpoints may be combined into a virtual talk group for communication using a particular IP address. As an example, the virtual talk group may be assigned a multicast IP address through which users of various endpoints may communicate on the talk group. The use of multicast IP addresses allows IS 20 to facilitate communications among communication devices and endpoints of various communication networks to provide audio, data, video and control network interoperability. As an additional example, in some cases multicast streams (e.g., streams utilizing multicast IP addresses) may be used. In some cases nailed dialed connections, such as those using session initiation protocol (SIP), may be used for communication among endpoints and with IS 20. Various embodiments may combine communication methods to facilitate communication among endpoints. For example, in some cases certain endpoints of a virtual talk group may participate in the talk group through a multicast IP address while other endpoints may utilize a nailed SIP connection. IS 20 may control this participation by, for example, controlling gateways, multipoint conferences and the mapping of communications to IP addresses.

IS 20 may be utilized and implemented in any number of market segments, such as enterprise safety and security (e.g., loss prevention), transportation, retail, public safety and/or federal agencies in order to provide radio and non-radio network interoperability within and between such market segments. As indicated above, such network interoperability includes the interoperability of push-to-talk voice technology within various networks and the interoperability between push-to-talk and full duplex dialed connections.

Because IS 20 may be able to facilitate communication between various endpoints of different communication networks, it may be ideally positioned to provide additional VTG functionality. For example, a company/organization may store their standard operating procedures within IS 20. Then, upon the occurrence of a particular incident, IS 20 may begin to perform the actions of the SOP. For example, if a fire is reported in a city IS 20 may initiate the SOP used in case of a fire and follow the actions of that SOP (e.g., create a VTG to handle the fire, alert the fire department, add the fire department and any nearby emergency response units to the fire VTG). Some of these actions may require that endpoints from different communication networks be able to communicate with one another. As discussed above this may be facilitated by IS 20.

Endpoints 22 and IS 20 may be any combination of hardware, software, and/or encoded logic that provides communication services to a user. In the illustrated embodiment, endpoints 22 comprise a personal computer (PC) (endpoint 22a), a personal digital assistant (PDA) (endpoint 22b) and an IP phone (endpoint 22c). However, in other embodiments, endpoints 22 may include a telephone, a video monitor, a camera, a cell phone, a land mobile radio (LMR), a command center, a sensor, or any other communication hardware, software and/or encoded logic that supports the communication of audio, video or other data, using packets of media (or frames) or otherwise, through communication system 10. Endpoints 22 and the endpoints and components of communication networks 24 may be capable of communicating using any particular type of technology, such as cellular, IP, PSTN, CDMA, GSM, TDMA and satellite. For example, in an embodiment that includes a sensor (e.g., a sensor such as a bank alarm that may be used to trigger an event) the sensors may communicate using sensor markup language (SML), simple object access protocol (SOAP), or any other standard or proprietary protocol. Endpoints 22 and IS 20 may also include unattended or automated systems, gateways, other intermediate components or other devices that can establish media sessions.

Although the illustrated embodiment includes five communication networks 24a-24e, the term "communication network" should be interpreted as generally defining any network capable of transmitting audio and/or video telecommunication signals, data, and/or messages, including signals, data or messages. Any one of networks 24a-24e may be implemented as a local area network (LAN), wide area network (WAN), cellular network, global distributed network such as the Internet, Intranet, Extranet, PSTN, LMR network, CDMA network, GSM network, TDMA network, satellite network or any other form of wireless or wireline communication network.

Communications over communication networks 24a-24e may use any suitable communication protocol. In particular embodiments, some communication networks may employ voice communication protocols that allow for the addressing or identification of endpoints, nodes, and/or other components coupled to the communication network. For example, using Internet protocol (IP), each of the components coupled together by communication network 24b in communication system 10 may be identified in information directed using IP addresses. In this manner, network 24b may support any form and/or combination of point-to-point, multicast, unicast, or other techniques for exchanging media packets among components in communication system 10. Any network components capable of exchanging audio, video, or other data are included within the scope of the present invention.

Since IP networks share a common method of transmitting data, telecommunication signals may be transmitted between telephony devices located on different, but interconnected, IP networks. In addition to being coupled to other IP networks, communication network 24b may also be coupled to non-IP telecommunication networks, for example through the use of interfaces or components, such as gateways. In the illustrated embodiment, communication network 24b may be coupled with PSTN 24c through a gateway. In some embodiments the gateway may be a part of IS 20 or network 24e. PSTN 24c may include switching stations, central offices, mobile telephone switching offices, pager switching offices, remote terminals, and other related telecommunications equipment located throughout the world. IP networks transmit data (including voice and video data) by placing the data in packets and sending each packet individually to the selected destination, along one or more communication paths. Unlike a circuit-switched network (like PSTN 24c), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, one or more of endpoints 22, and endpoints and components of communication networks 24 may be IP telephony devices capable of participating in IM, video, and other multimedia communication sessions. IP telephony devices have the ability of encapsulating a user's voice (or other input) into IP packets so that the voice can be transmitted over a communication network. IP telephony devices may include telephones, fax machines, computers running telephony software, nodes, gateways, wired or wireless devices, hand held PDAs, or any other device capable of performing telephony functions over an IP network.

In particular embodiments, communication system 10 may receive and transmit data in a SIP environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Although FIG. 1 illustrates a particular number and configuration of endpoints, IS and communication networks, communication system 10 contemplates any number or arrangement of such components for communicating media.

Figure 2:
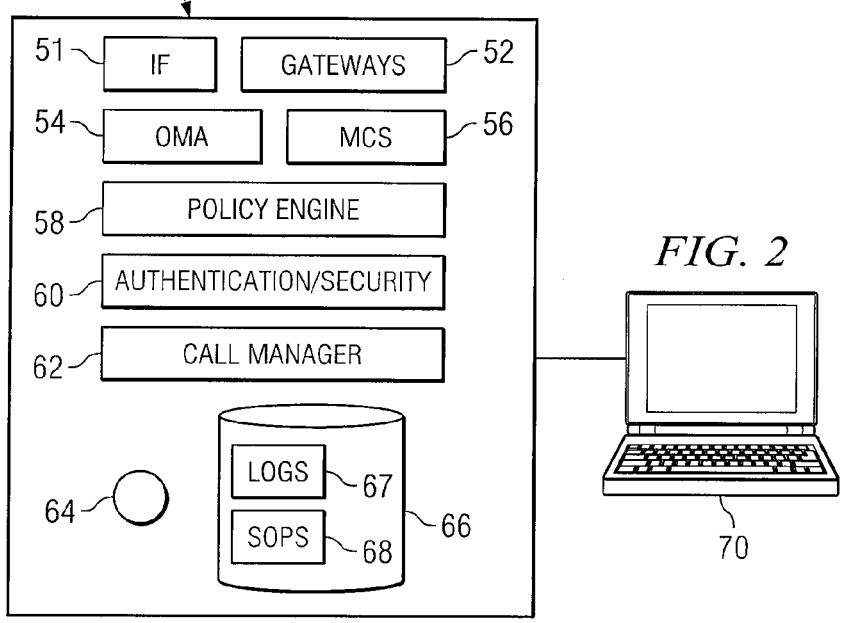
FIG. 2 illustrates an example interoperability system, in accordance with particular embodiments.

FIG. 2 illustrates interoperability system (IS) 50, in accordance with particular embodiments. IS 50 may be similar to and provide the same functionality as IS 20 of FIG. 1. In the illustrated embodiment, IS 50 includes interface 51, gateways 52, operations management application (OMA) 54, multipoint conference system (MCS) 56, policy engine 58, authentication and security system 60, call manager 62, processor 64 and memory module 66. IS 50 is coupled to PC endpoint 70 that may be used to access, configure and control various functionality provided by IS 50. PC endpoint 70 may run a client application for such access, configuration and control. The client application may enable a user of endpoint 70 to receive and monitor communications from various endpoints and virtual talk groups. In particular embodiments, other types of endpoints may be utilized to access, configure and control IS 50, such as IP phones, PDAs and mobile devices. IS 50 may be coupled to such endpoints (including PC endpoint 70) through one or more communication networks.

Interface 51 is used in the communication of audio, video, signaling and other data between IS 50 and other network components. For example, interface 51 may receive communications from endpoints such as endpoint 70 or endpoints 22 of FIG. 1. In some embodiments, interface 51 may receive input from sensors (e.g., bank alarms) or other input devices (e.g., a really simple syndication (RSS) feed). The communication may take place over wire or wireless IP networks thereby negating the need for dedicated wiring between the endpoints, sensors or input sources and the IS.

Gateways 52 may include any suitable gateways to provide network interoperability and back-end legacy application integration, such as LMR gateways, PSTN gateways and application gateways. Gateways 52 may provide mapping between IP services and the interoperable networks, such as LMR network 24a of FIG. 1. In some cases gateways 52 may not be located within an IS but may be distributed throughout a communication system for enabling communications among various communication networks.

Operations management application (OMA) 54 includes functionality for configuration, management and control of IS 50, including conference and collaboration management, and may be accessed by a user via, for example, PC endpoint 70. In particular embodiments, OMA 54 may enable a user (e.g., dispatch personnel or administrators) or a mobile user accessing IS 50 via a mobile endpoint (e.g., a first responder mobile user), the ability to configure, manage and participate in one or more virtual talk groups and ad hoc conferences simultaneously. In particular embodiments, OMA 54 may be accessed through a web interface functioning, for example, as a soft phone for radios. A screen display may be controlled using a mouse, keypad, touch screen, voice commands or any other suitable interface. OMA 54 screens may include any number of functional controls to provide interoperable communications. OMA 54 may authenticate a user and obtain user configuration information upon a user accessing the OMA. OMA 54 may monitor and provide communication ability for any number of channels at one time to provide the ability for an OMA user to communicate on and control multiple virtual talk groups at once.

Multipoint conference system (MCS) 56 provides collaboration and conference services for multiple endpoints of one or more networks. For example, users of multiple endpoints (such as LMRs of different networks (e.g., networks of different agencies or groups) and different types of endpoints of different networks) may be bridged together through MCS 56 to provide virtual talk group communications. In particular embodiments, these endpoints may be patched together on a dynamic, as needed basis. In some cases a virtual talk group may not necessarily include communications through an IS but may instead include member endpoints whose communications are mapped to IP addresses at gateways (such as LMR gateways) controlled by IS 50. MCS 56 may include any suitable number or type of conference bridges, ports, digital signal processors or other components to facilitate communications discussed herein.

Policy engine 58 includes policies for undertaking various operations and functionality upon the occurrence of various events to provide dynamic incident management. These policies may include pre-determined policies which may be referred to as standard operating procedures (SOP). Upon the occurrence of a specific incident a corresponding SOP may be executed by an incident manager, dispatch personnel, or automatically by IS 50. Each SOP may include its own set of actions that may be performed either automatically by IS 50 (e.g., creating a new VTG just for the incident) or by a user (e.g., contacting the chief of police). The incident may include a unique identifier and may have basic incident attributes such as time of creation, name of the creator of the incident, location of the incident and incident status information. However, during the course of handling the specific incident, circumstances may arise that require, or might benefit from, a deviation from the SOP. The circumstances giving rise to the need/desire to deviate from the SOP may be detected from user input, inputs from alarms and sensors and/or any other internal or external automatic or manual source. Some of the functions or steps of the SOP, or any deviations, may include, for example, setting up device diagnostic communications, facilitating communication interoperability and/or establishing one-way or two-way video and data collaboration. The SOP may also include triggering additional actions such as transmitting pager or e-mails notifications, dial-outs, and/or initiating event logging or communication recording. For example, one of the actions of an SOP may be to shut off the power to a building. However, during the incident it may become apparent that the power for the building is required for a particular task. Accordingly, a firefighter on the scene may turn on the power manually. This deviation may be recorded and used later to alter the SOP in a way that delays or eliminates the action of shutting off the power in the building. Other functions and/or steps may also be implemented in SOPs or SOP deviations.

Authentication and security system 60 manages access, configuration and control privileges for users of IS 50 and those participating in interoperable communications. For example, different users may have different privileges assigned for interoperable communications. Some users may only have transmit or listen privileges with respect to one or more particular talk groups, while other users may have the ability to communicate in all talk groups or setup and configure various talk groups. User privileges may change dynamically upon the occurrence of particular events or changes in the SOP. For example, control of the incident may change from a higher ranking officer to a lower ranking officer who specializes in handling this particular type of incident.

Call manager 62 may maintain information regarding various users, such as users of IP networks for which interoperable communications are provided by IS 50. This facilitates in the extension of PTT to IP networks and in the provision of voice and data interoperability across radio and non-radio networks. In particular embodiments, call manager 62 may maintain a listing, table, or other organization of information about users. The information may include a name or other identifier and contact information such as phone numbers and email addresses for the users. In particular embodiments call manager 62 may represent any appropriate combination of hardware, software and/or encoded logic distributed throughout a communication network coupled with an IS.

Processor 64 may be a microprocessor, controller, or any other suitable computing device, resource, or combination of hardware, software and/or encoded logic operable to provide, either alone or in conjunction with other IS 50 components, such as OMA 54, IS functionality. Such functionality may include providing various features discussed herein to a user, such as a user of an endpoint accessing IS 50 through OMA 54. One feature that certain embodiments may provide may include detecting and categorizing events that occur during the course of an incident. Based on these events processor 64 may be able to determine if there should be a deviation from the SOP and if so, what that deviation should entail. Other features of particular embodiments may include determining whether an endpoint should be added to a VTG, enabling the user to listen to and/or participate in communications involving endpoints and/or virtual talk groups associated with a particular incident, presenting communications of endpoints of virtual talk groups according to preconfigured or received instructions and controlling various gateways and other network components to facilitate interoperable communications among various endpoints.

Memory module 66 may be any form of volatile or non-volatile memory including, without limitation, magnetic media, optical media, random access memory (RAM), read-only memory (ROM), removable media, or any other suitable local or remote memory component. Memory module 66 may store any suitable data or information, including software and encoded logic, utilized by IS 50. For example, memory module 66 includes logs partition 67 and SOPs partition 68. Logs partition 67 may comprise information regarding various events, actions, communications or other inputs received during the course of an incident. This information may then be used in a variety of ways after the incident is over. For example, the information may be used to create new SOPs, update or revise current SOPs, or train users in handling similar incidents. SOPs partition 68 may comprise an organization's SOP for a particular incident. Each SOP may be comprised of several actions to be performed, either by a user or by IS 50.

IS 50 may also include any number of switches, routers, firewalls, mobile access routers, access points, wireless bridges and other components in order to accommodate particular operational desires and needs.

In particular embodiments such as in the LMR network interoperability context, IS 50 may, through one or more components discussed above or through other components, encode received audio with a standard audio codec, such as G.711, G.729, or improved multi-band excitation (IMBE). Those audio samples may be packaged in standards-based real-time transport protocol (RTP) packets suitable for transport on an IP network. At this point, the communication element may be abstracted from the distinctive characteristics of each radio system. These audio packets can be sent across the network to other radio systems either individually (unicast) or as a group (multicast). The recipient of the audio packets may be a device capable of receiving and decoding the RTP stream, such as an IP telephone or PC with appropriate software. The IP network and IP-enabled devices can be used to allow users to monitor or transmit on a particular radio channel from a desk without issuing another radio.

As indicated above, IS 50 may facilitate communication among users of endpoints of various networks through virtual channels or talk groups. For example, a channel may comprise a unidirectional or bidirectional path for transmitting and/or receiving electrical or electromagnetic signals. This may comprise, for example, a conventional radio physical RF channel. A talk group in this context may be a subgroup of users (e.g., radio users) who share a common functional responsibility and typically coordinate actions amongst themselves without radio interaction with other subgroups. For example, a municipality's police department network may include various talk groups.

A virtual talk group (VTG) may represent interoperability of a group of channels, for example, as an audio conference or meeting. A VTG may include an associated virtual channel and an ID. Virtual channels may comprise an address, such as an IP address, associated with a VTG through which users may access the VTG and/or through which communications from VTG member-endpoints are bridged. Various types of VTGs may be utilized in particular embodiments, such as a multicast address usable by all endpoints of the VTG, a VTG comprising multiple talk groups (e.g., multiple radio sources from different frequencies whose communications are mixed), a unicast group and a combination unicast and multicast group.

As an example, a particular VTG may comprise a conference or meeting of the following: (1) a channel or other multicast path used by certain users of a police department's radio network, (2) a channel or other multicast path used by certain users of a fire department's radio network, (3) a channel or other multicast path used by certain users of a corporation's security radio network, (4) a plurality of users of IP-enabled endpoints such as IP phones, IP-enabled PDAs or PCs and (5) a plurality of users of plain old telephones (POTs) such as cell phones or time-division multiplexed (TDM) phones. An operator of IS 50 may configure the VTG using any suitable interface, such as by dragging and dropping the included channels and IP endpoints into a single area representing the VTG. The IS may itself configure the VTG, such as by including within a VTG users trained to handle the particular incident for which the VTG was created (e.g., IS 50 may add police officers to a VTG created to handle a high speed car chase) Regardless of how the VTG is initially configured, during the life of the VTG the various users comprising the VTG may change as the incident unfolds.

Any number of VTGs may be configured to provide any suitable audio, data, video and control network interoperability. VTGs may be created in accordance with one or more SOPs using any suitable user/endpoint groups or channels based on location, organizational requirements, event requirements or any other suitable characteristic. An administrator or operator may configure channel details such as name, description, participants, multicast IP addresses, codec and latch options through, for example, OMA 54.

Figure 3:
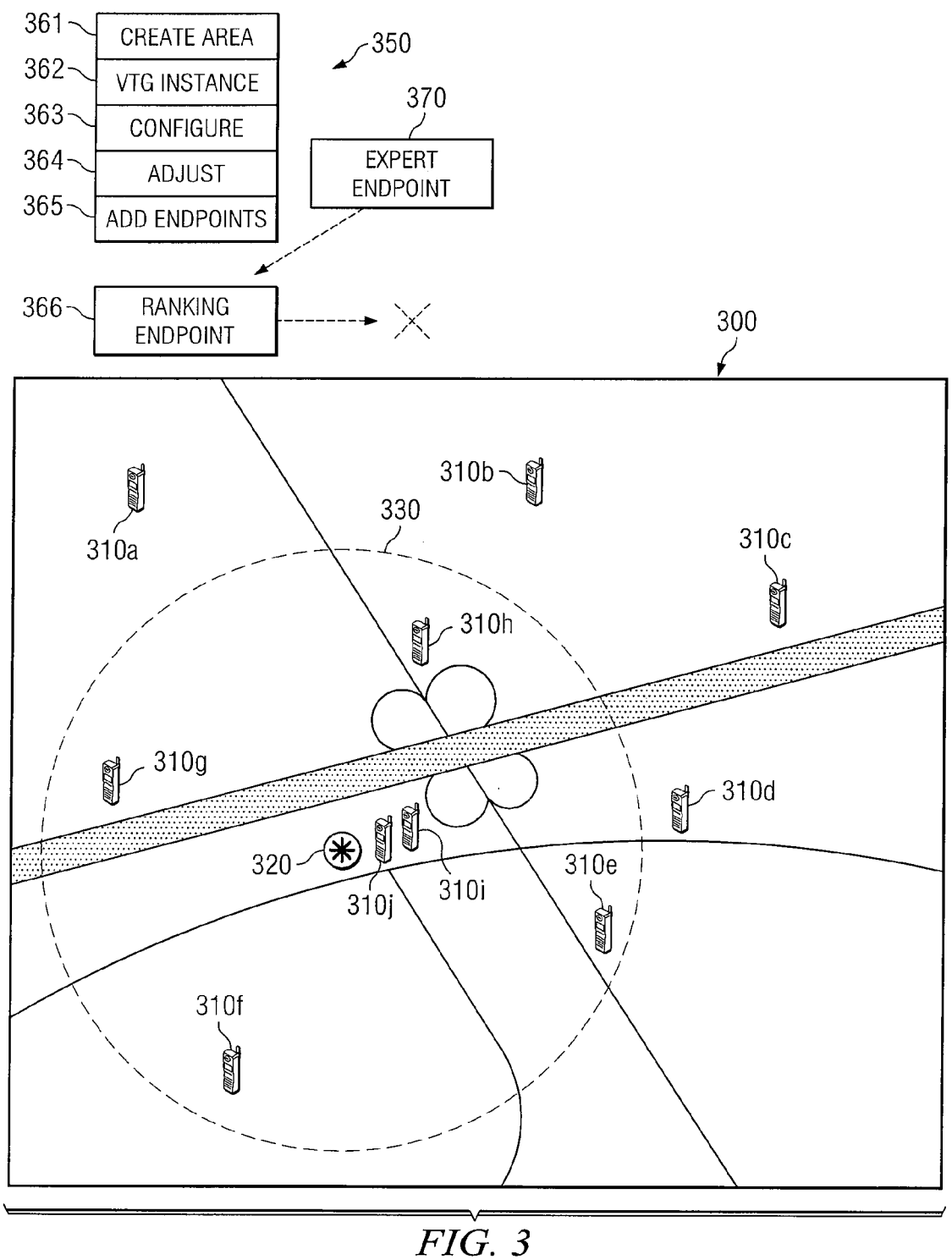
FIG. 3 illustrates a geographical representation of the location of various endpoints relative to an incident and of the actions of an associated standard operating procedure, in accordance with a particular embodiment.

FIG. 3 illustrates a geographical representation of the location of various endpoints relative to an incident and of the actions of an associated standard operating procedure, in accordance with a particular embodiment. City 300 includes ten different endpoints (endpoints 310*a*-310*j*). These endpoints may be associated with different agencies or organizations and may be part of one or more talk groups or VTGs and may be communicating on different communication networks. In some cases, endpoints of different communication networks may include endpoints that are communicating on different channels or frequencies. Bomb threat standard operating procedure (BTSOP) 350 includes actions 361-366.

An IS, such as IS 50 depicted in FIG. 2, may facilitate interoperable communications among endpoints such that communications transmitted by endpoints of one communication network may be communicated, through one or more base stations or other network components, to an endpoint of a different communication network. In addition, the IS may convert communications received from these endpoints to IP packets for transmission and receipt by particular IP endpoints. In some cases, the IS may control various gateways to facilitate the conversion of communications to IP packets. It should be noted that when an endpoint within a VTG uses a particular communication network the IS may not necessarily cause their messages to be rebroadcast among other endpoints using the same communication network because the message may already be propagated by that communication network. For example, in a LMR network a communication transmitted by one endpoint on channel A may be received by any other endpoints within range of the LMR network who are also using channel A.

The IS may also be able to receive input, messages, or signaling from various other input devices (e.g., sensors). By combining the data received from input devices with the IS's ability to detect/receive communications the IS may be able to provide more advanced functionality. For example, the IS may comprise predetermined policies or standard operating procedures (SOPS) that provide actions, steps, and/or suggestions for one or more members of the VTG. Such a SOP and its associated actions is graphically represented by BTSOP 350 and actions 361-366. As events unfold during the life of the VTG the IS may be able to determine that it would be beneficial to deviate from the SOP and may suggest or enact an appropriate modification to the SOP (e.g., replacing action 366 with deviation 370). Additionally, a dispatcher may determine that a deviation would be beneficial; this deviation may be logged by the IS. In order to better understand how an IS may implement an SOP and adapt to any deviations that may arise, the endpoints of city 300 will be used in the following example.

Assume that prior to the moment in time depicted in FIG. 3 a police dispatcher receives a call informing the dispatcher that a bomb has been found within a building located at incident 320. The dispatcher uses any of a variety of means (e.g., touch screen, mouse/keyboard) to inform the IS that incident 320 has occurred. Upon receiving notification of the bomb threat, the IS may initiate BTSOP 350. Accordingly, action 361 may dictate that first event area 330 should be created having a certain radius around incident 320. The radius of event area 330 may be predetermined (e.g., a bomb threat always involves an event area having a five mile radius) or dynamic (e.g., the event area should be large enough to encompass fifteen emergency response endpoints, or it may be based on the size/location of the building). Actions 362-364 may then provide the actions used to establish a VTG to handle the bomb threat. For example, action 362 may create the VTG instance which the dispatcher may interact with; action 363 may configure any gateways that will be used to facilitate communication among different communication networks; and action 364 may adjust any radios to the proper channel/frequency for use with the VTG. Once event area 330 has been determined and the bomb threat VTG (BTVTG) has been created and configured action 365 may then dictate that any emergency response endpoints (e.g., fire, police, paramedics) within event area 330 should be patched into the BT VTG. In certain embodiments this may involve the IS looking up the identity and contact information for one or more of endpoints 310. Action 366 may then require that the relative ranks of the endpoints within the BT VTG are compared and the highest ranking endpoint is then placed in charge of the VTG.

However, if the IS recognizes that endpoint 310g is the highest ranking endpoint, but that it is not yet on the scene, it may generate deviation 370 suggesting that the dispatcher deviate from the SOP and place endpoint 310j in charge of the incident (at least until endpoint 310g is able arrive and get himself sufficiently apprised of the situation). As another example, the dispatcher may recognize endpoint 310h as being an expert on bombs and so she may decide to make endpoint 310h in charge even though he is not the highest ranked endpoint. As may be apparent, these are just two example deviations. Different surrounding facts and circumstances may trigger other deviations.

Regardless of whether deviation 370 is initiated by the IS, the dispatcher, or any other endpoint the IS creates a log of the action. The IS may also log any communications (e.g., the communication itself and/or pertinent information about the communication, such as the time the communication was transmitted, which endpoints were a part of the VTG, or the ID and/or role of the sender and recipient of the communication) and/or input that is received (e.g., data from an internal or external device). This log may then be studied and/or analyzed later. For example, personnel responsible for determining the actions/procedures of an organization's SOP may note that the dispatcher elected to have endpoint 310h (the bomb expert) in charge rather than the highest ranking officer. They could then look at the subsequent log of events that took place and compare them to logs from other instances in which a bomb threat was handled by the highest ranking officer. If their analysis indicates that endpoint 310h handled incident 320 better than how bomb threats had been handled when the higher ranking, non-expert, endpoint was in charge then they may update BTSOP 350 to include deviation 370. More specifically, the updated BTSOP 350 may first determine if a bomb expert is available, and, if not then determine the highest ranking endpoint.

The log created by the IS may also be used for training purposes. For example, the police department may wish to run a bomb threat simulation to prepare a new dispatcher for such an incident. By using the logs stored from different actual incidents the trainee may be trained from a variety of real world incidents rather than from scripted training simulations.

In some embodiments the IS may also be able to update or revise SOPs based on how the deviations were handled in response to other incidents. For example, if during a prior incident a dispatcher had designated the closest endpoint as initially being in charge of a hostage situation, the IS may update BTSOP 350 so that action 366 places the closest endpoint in charge until a higher ranking endpoint has time to become informed of the situation. The SOPs may be revised prior to being initiated, thus potentially avoiding the need for deviation 370. As another example, the SOP may not itself be revised but the IS may present deviation 370 based on a modification to another SOP. More specifically, if a user updates the SOP for handling a forest fire to require that an expert be put in charge, regardless of relative rank, the IS may present deviation 370 for other events in which it would be advantageous to have an expert in charge of the incident instead of the highest ranking endpoint (e.g., BTSOP 350).

Deviation 370 may involve the IS automatically performing certain actions, such as automatically designating an expert as the endpoint in charge, or it may involve the IS making a suggestion, such as suggesting that the dispatcher initially put the closest endpoint in charge of the incident. In some embodiments the IS may be able to modify prior deviations to adapt them to a current incident. For example, assume that incident 320 is not a bomb threat, but rather a hostage situation and that the IS (or the appropriate organizational personnel) has determined that incidents are handled better when an expert is in charge. Unfortunately none of the endpoints within event area 330 are experts in hostage negotiation. The IS may suggest that the dispatcher contact an expert and have them go to incident 320. In some embodiments the IS may be able to track what endpoints are on duty or on call and what their area/areas of expertise are. Thus, the IS may be able to suggest a specific endpoint for the dispatcher to contact or it may automatically attempt to put the dispatcher in contact with the specific endpoint.

It will be recognized by those of ordinary skill in the art that endpoints and interoperability systems disclosed herein are merely example configurations in accordance with particular embodiments. These systems may include any number of interfaces, processors, memory modules, and other components to accomplish the functionality and features described herein. In addition, these components and other desired components for performing the above described functionality may be centrally located (local) with respect to one another, or distributed throughout communication systems and networks. In addition, one or more components of these systems and devices may work together in performing various functionality described herein.

Figure 4:
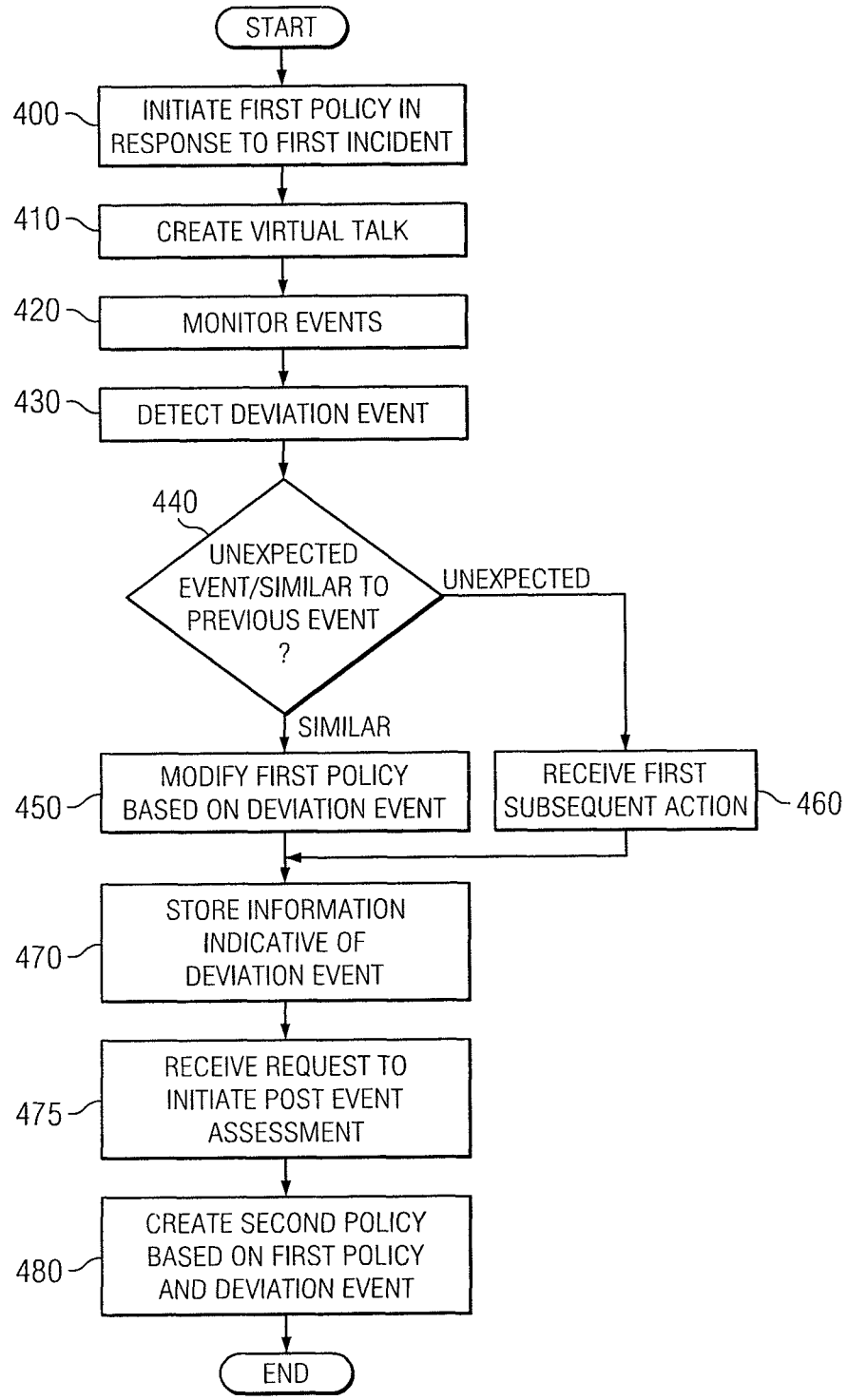
FIG. 4 illustrates a method for handling dynamic incidents, in accordance with particular embodiments.

FIG. 4 illustrates a method for handling dynamic incidents, in accordance with particular embodiments. The method begins at step 400 where an IS initiates a first policy in response to a first incident. In certain embodiments the first policy may be initiated in response to receiving an indication of the first incident, for example from a sensor or a phone call. The first policy may comprise several actions, such as actions 361-366 of BTSOP 350 depicted in FIG. 3. The actions may be performed by the IS, a user (e.g., a dispatcher) or some combination of the two. The first incident may be any type of incident for which it may be advantageous to have communication among endpoints from different communication technologies or channels.

At step 410 the IS creates a virtual talk group to handle the incident. The virtual talk group may comprise a plurality of endpoints of different communication networks. It should be understood that for purposes of the descriptions and claims herein, whenever a VTG is described as comprising a plurality of endpoints of different communication networks, in addition to including at least some endpoints of different communication networks, the VTG may also include some endpoints of the same communication network. For example, the VTG may include a plurality of endpoints of the same police department network in addition to one or more endpoints of other communication networks, such as other police or fire department or private company networks. Moreover, in some cases, endpoints of different communication networks may include endpoints that are communicating on different channels or frequencies. The different communication networks may comprise networks of different technologies, such as IP, cellular, PSTN, LMR, CDMA, GSM, TDMA, GPRS and satellite. In particular embodiments, at least some of the endpoints of the virtual talk group may communicate through PTT technology. In addition, some of the endpoints may comprise IP endpoints. Moreover, the different communication networks may comprise networks of various safety and security agencies, whether public or private, as well as networks of public and private groups, companies or organizations. The communications and/or information indicative of the communication may be received at the IS.

At step 420 the IS monitors events of the VTG. More specifically, the IS monitors events such as the communications transmitted by the endpoints within the VTG, the procedures performed by the dispatcher, and/or input from various other sources both internal and external to the IS, such as sensors. The IS may be monitoring the events for a variety of reasons. For example, the IS may be creating a log of the events of the VTG, or it may be comparing the events of the VTG to the actions of the first policy to ensure that the actions of the first policy are being followed. By comparing the events of the VTG to the actions of the first policy the IS may be able determine when to initiate the next action and when a deviation event has occurred.

At step 430 the IS detects a deviation event. The deviation event may comprise any event that differs from the next expected action of the SOP or for which it may be desirable to perform (or suggest the performance of) an action that is either not part of the first policy or that is normally performed at a later time. For example, the first policy may, based on a fire being reported in City A, require the dispatcher to call City A's fire department. However, the dispatcher may know that City B's fire department is actually closer to the fire and so he may call City B's fire department instead of City A's fire department. As another example, the IS may detect that a bank robbery is occurring during the middle of the day and has lasted longer than a traditional bank robbery. The IS may then suggest that a hostage negotiator be called in, even though it is not part of the first policy.

The next step after detecting the deviation event may depend on whether the deviation event was an unexpected event or was similar to a previous event. This is shown at decision step 440. The bank robbery example from above may be an example of a similar deviation event. More specifically, a prior robbery of a convenience store may have lasted two hours longer than normal before the dispatcher called in a hostage negotiator. Thus, the bank robbery lasting longer than normal may be similar to the convenience store robbery lasting longer than normal. Calling City B's fire department may be an example of an unexpected deviation. More specifically, the IS may not previously have had the dispatcher call a fire department other than the one within the city of the fire.

In the depicted embodiment, upon determining that the deviation event is similar to a previous event the IS modifies the first policy based on the deviation event at step 450. The first policy may be modified in any of a variety of ways depending on the deviation event and the timing of its occurrence. The modification may be temporary (e.g., the first policy is only modified for this particular incident) or long term (e.g., the deviation becomes integrated into the first policy). Depending on the scenario the modification may involve changing the order of actions of the first policy, adding new actions to the first policy, removing actions from the first policy, or replacing actions of the first policy with new actions. Because the deviation event is similar to a previous deviation event, the IS may be able to use how the previous deviation event was handled to make the modification performed at step 450. In other embodiments, instead of modifying the first policy the IS may generate a suggested modification that is then presented to a user, for example the dispatcher. In some scenarios the modification may not be implemented until the IS receives some sort of confirmation or approval from the dispatcher. In particular scenarios, the suggested modification may not involve any further action by the IS (e.g., the IS may suggest that the dispatcher call the chief of police). By having the IS generate a suggestion rather than automatically initiating a modification to the first policy, the dispatcher is given the ability to decide whether or not the modification to the first policy is implemented.

In this embodiment, upon the deviation event being an unexpected event, the IS receives a first subsequent action at step 460. In certain situations the first subsequent action may involve receiving a request or command from the dispatcher. For example, assume that in the event of an emergency during a flight the SOP dictates that the nearest airfield within range of the airplane is identified and then the airplane is diverted to that airfield. However, if during an actual in-flight emergency IS detects that there are no airfields within range of the airplane experiencing the emergency, the IS may alert the air traffic controller that it is not able to initiate the next step in the SOP because there are no airfields within range of the airplane. Because this is an unexpected deviation the IS may not have a suggestion or modification for the next action of the SOP. The air traffic controller may then tell the IS to divert the airplane to an abandoned highway and to alert the local emergency response teams that the airplane is making an emergency landing at the abandoned highway. In this scenario the deviation event was not being able to locate an airfield within range, and the subsequent action was the air traffic controller's command to divert the airplane to the abandoned highway.

In some scenarios the deviation event may be the first subsequent action. For example, assume that the SOP for a hydroelectric power plant dictates that if the water level at a particular dam reaches a certain level that an overflow floodgate is to be opened until the water level returns to a normal level and if the overflow gate does not open then a flood response team is to be put on alert. If, upon the water level reaching the critical level the floodgate operator opens an auxiliary floodgate (instead of the overflow floodgate) until the water level returns to a normal level, then the flood response team may not be put on alert even though the overflow floodgate was not opened. In this scenario the unexpected opening of the auxiliary floodgate was both the subsequent action and the deviation event.

At step 470 (regardless of whether the deviation event was unexpected or similar to a previous deviation event) the IS stores information indicative of the event. This may include both information related to the deviation event itself as well as information related to the response to the deviation event (e.g., any modifications or subsequent actions that were performed). The information that is stored may include information related to the event itself and/or pertinent information about the event, such as the time of the event, which endpoints were a part of the VTG and their ID and/or role, and/or any other information that may be of assistance in later analyzing how the incident was handled.

At step 475 a request to initiate post event assessment is received. The request may be received immediately after the incident has been resolved, some time after the incident has been resolved, and/or on a periodic basis. For example, after a big fire a group of consultants may analyze how the fire was handled and how different deviation events were handled. As another example, an organization may, twice a year, go through the records of all the incidents that were handled since the last evaluation and analyze how those incidents were handled. In some embodiments the post event assessment may involve a graphical user interface that presents the user with some combination of the actions of the first policy, the events that occurred during the incident, details regarding the deviation event, details regarding any modifications or subsequent actions, and any other information that may be useful in analyzing how an incident was handled. In certain embodiments the IS may also include a prompt that may be presented to the user reviewing the first policy. The prompt may ask whether a particular modification or subsequent action should be added to the first policy or any other policies.

At step 480 the IS may then use the first policy and the deviation event to create a second policy. The second policy may replace the first policy or it may be added to a stockpile of policies maintained by the IS. In some scenarios, the first policy may simply be modified or update based on the deviation event and/or any subsequent actions executed after the deviation event occurred. Whether to create a new policy, replace an old policy or update an existing policy may be decided by a user selecting the appropriate option, performed automatically by the IS, or some combination of the two.

Though not depicted it may be that the result of the post event assessment is a determination that the first policy is acceptable the way it is. In such an instance step 480 may be skipped and the first policy may remain as it is. In some embodiments the actions of the first policy may remain the same, but an indication associated with the first policy may be updated to indicate when the first policy was last reviewed.

Some of the steps illustrated in FIG. 4 may be combined, modified or deleted where appropriate, and additional steps may also be added to the flowchart. Additionally, steps may be performed in any suitable order without departing from the scope of the invention.

While various implementations and features are discussed with respect to multiple embodiments, it should be understood that such implementations and features may be combined in various embodiments. For example, features and functionality discussed with respect to a particular figure such as one of FIG. 2 or 3 may be used in connection with features and functionality discussed with respect to another such figure according to operational needs or desires.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10 and illustrated endpoints and interoperability systems, these elements may be combined, rearranged or positioned in order to accommodate particular routing architectures or needs. In addition, any of these elements may be provided as separate external components to communication system 10 and illustrated endpoints and interoperability systems, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for handling dynamic incidents, comprising:
    initiating, at a first time, a first policy in response to a first incident, the first policy comprising a first plurality of actions to be performed in response to the first incident;
    creating, by a first processor, at least a first virtual talk group comprising a first plurality of endpoints of different communication networks communicating using a first respective communication protocol;
    monitoring a first plurality of events via a first plurality of sources, the first plurality of events including at least one of the first plurality of actions of the first policy, the first plurality of sources comprising an endpoint from the first plurality of endpoints of the first virtual talk group;
    detecting a first deviation event in the monitored first plurality of events, the first deviation event comprising a first action not included in the first plurality of actions of the first policy;
    storing information indicative of the first deviation event;

initiating, at a second time, a second policy in response to a second incident, the second policy comprising a second plurality of actions to be performed in response to the second incident;

creating, by a second processor, at least a second virtual talk group comprising a second plurality of endpoints of different communication networks communicating using a second respective communication protocol;

monitoring a second plurality of events via a second plurality of sources, the second plurality of events including at least one of the second plurality of actions of the second policy, the second plurality of sources comprising an endpoint from the second plurality of endpoints of the second virtual talk group;

detecting a second deviation event in the monitored second plurality of events, the second deviation event comprising a second action not included in the second plurality of actions of the second policy;

comparing the second deviation event to the first deviation event;

generating, based on the comparison, a suggestion comprising at least one modification to the second policy;

receiving an indication in response to the suggestion, the indication indicating whether to modify the second policy in accordance with the suggestion; and storing information indicative of the second deviation event.

2. The method of claim 1, wherein each of the first deviation event and the second deviation event comprises an unexpected event.

3. The method of claim 1, wherein the second deviation event is similar to the first deviation event.

4. The method of claim 1, further comprising modifying the first policy based on the first deviation event.

5. The method of claim 1, further comprising creating a third policy based on the first policy and the first deviation event.

6. The method of claim 1, further comprising:
receiving a post incident assessment request;
presenting a user with the first plurality of events that occurred during the first incident; and
receiving a modification request indicating that the first policy is to be modified based on the first deviation event or that a third policy is to be created based on the first policy and the first deviation event.

7. A system for handling dynamic incidents, comprising:
a first processor operable to:
initiate, at a first time, a first policy in response to a first incident, the first policy comprising a first plurality of actions to be performed in response to the first incident; and
create at least a first virtual talk group comprising a first plurality of endpoints of different communication networks communicating using a first respective communication protocol; and
a first interface coupled to the processor, the first interface operable to:
monitor a first plurality of events via a first plurality of sources, the first plurality of events including at least one of the plurality of actions of the first policy, the first plurality of sources comprising an endpoint from the first plurality of endpoints of the first virtual talk group; and
detect a first deviation event in the monitored first plurality of events, the first deviation event comprising an action not included in the first plurality of actions of the first policy;

the first processor is further operable to store information indicative of the deviation event;
a second processor operable to:
initiate, at a second time, a second policy in response to a second incident, the second policy comprising a second plurality of actions to be performed in response to the second incident; and
create at least a second virtual talk group comprising a second plurality of endpoints of different communication networks communicating using a second respective communication protocol;
a second interface coupled to the second processor, the second interface operable to:
monitor a second plurality of events via a second plurality of sources, the second plurality of events including at least one of the second plurality of actions of the second policy, the second plurality of sources comprising an endpoint from the second plurality of endpoints of the second virtual talk group;
detect a second deviation event in the monitored second plurality of events, the second deviation event comprising a second action not included in the second plurality of actions of the second policy;
compare the second deviation event to the first deviation event;
generate, based on the comparison, a suggestion comprising at least one modification to the second policy; and
receive an indication in response to the suggestion, the indication indicating whether to modify the second policy in accordance with the suggestion;
the second processor is further operable to store information indicative of the second deviation event.

8. The system of claim 7, wherein each of the first deviation event and the second deviation event comprises an unexpected event.

9. The system of claim 7, wherein the second deviation event is similar to the first deviation event.

10. The system of claim 7, wherein the processor is further operable to modify the first policy based on the first deviation event.

11. The system of claim 7, wherein the processor is further operable to create a third policy based on the first policy and the first deviation event.

12. The system of claim 7, wherein the interface is further operable to:
receive a post incident assessment request;
present a user with the first plurality of events that occurred during the first incident; and
receive a modification request indicating that the first policy is to be modified based on the deviation event or that a third policy is to be created based on the first policy and the deviation event.

13. A non-transitory, computer readable medium comprising logic, the logic comprising code operable, when executed by a processor, to:
initiate, at a first time, a first policy in response to a first incident, the first policy comprising a first plurality of actions to be performed in response to the first incident;
create at least a first virtual talk group comprising a first plurality of endpoints of different communication networks communicating using a first respective communication protocol;
monitor a first plurality of events via a first plurality of sources, the first plurality of events including at least one of the first plurality of actions of the first policy, the first plurality of sources comprising an endpoint from the first plurality of endpoints of the first virtual talk group;

detect a first deviation event in the monitored first plurality of events, the first deviation event comprising a first action not included in the first plurality of actions of the first policy;

store information indicative of the first deviation event;

initiate, at a second time, a second policy in response to a second incident, the second policy comprising a second plurality of actions to be performed in response to the second incident;

create, by a second processor, at least a second virtual talk group comprising a second plurality of endpoints of different communication networks communicating using a second respective communication protocol;

monitor a second plurality of events via a second plurality of sources, the second plurality of events including at least one of the second plurality of actions of the second policy, the second plurality of sources comprising an endpoint from the second plurality of endpoints of the second virtual talk group;

detect a second deviation event in the monitored second plurality of events, the second deviation event comprising a second action not included in the second plurality of actions of the second policy;

compare the second deviation event to the first deviation event;

generate, based on the comparison, a suggestion comprising at least one modification to the second policy;

receive an indication in response to the suggestion, the indication indicating whether to modify the second policy in accordance with the suggestion; and store information indicative of the second deviation event.

14. The medium of claim 13, wherein each of the first deviation event and the second deviation event comprises an unexpected event.

15. The medium of claim 13, wherein the second deviation event is similar to the first deviation event.

16. The medium of claim 13, wherein the code is further operable to modify the first policy based on the first deviation event.

17. The medium of claim 13, wherein the code is further operable to create a third policy based on the first policy and the first deviation event.

18. The medium of claim 13, wherein the code is further operable to:

receive a post incident assessment request;

present a user with the first plurality of events that occurred during the first incident; and receive a modification request indicating that the first policy is to be modified based on the deviation event or that a third policy is to be created based on the first policy and the deviation event.

19. A system for handling dynamic incidents, comprising:

means for initiating, at a first time, a first policy in response to a first incident, the first policy comprising a first plurality of actions to be performed in response to the first incident;

means for creating at least a first virtual talk group comprising a first plurality of endpoints of different communication networks communicating using a first respective communication protocol;

means for monitoring a first plurality of events via a first plurality of sources, the first plurality of events including at least one of the first plurality of actions of the first policy, the first plurality of sources comprising an endpoint from the first plurality of endpoints of the first virtual talk group;

means for detecting a first deviation event in the monitored first plurality of events, the first deviation event comprising a first action not included in the first plurality of actions of the first policy;

means for storing information indicative of the first deviation event;

means for initiating, at a second time, a second policy in response to a second incident, the second policy comprising a second plurality of actions to be performed in response to the second incident;

means for creating at least a second virtual talk group comprising a second plurality of endpoints of different communication networks communicating using a second respective communication protocol;

means for monitoring a second plurality of events via a second plurality of sources, the second plurality of events including at least one of the second plurality of actions of the first policy, the second plurality of sources comprising an endpoint from the second plurality of endpoints of the second virtual talk group;

means for detecting a second deviation event in the monitored second plurality of events, the second deviation event comprising a second action not included in the second plurality of actions of the second policy;

means for comparing the second deviation event to the first deviation event;

means for generating, based on the comparison, a suggestion comprising at least one modification to the second policy;

means for receiving an indication in response to the suggestion, the indication indicating whether to modify the second policy in accordance with the suggestion; and means for storing information indicative of the second deviation event.

* * * * *